US012746183B2

(12) United States Patent
Huynh

(10) Patent No.: US 12,746,183 B2
(45) Date of Patent: Sep. 29, 2026

(54) MEDICATION DISPENSING CONTROL SYSTEMS

(71) Applicant: Jenny Huynh, Fort White, FL (US)

(72) Inventor: Jenny Huynh, Fort White, FL (US)

( * ) Notice: Subject to any disclaimer, the term of this patent is extended or adjusted under 35 U.S.C. 154(b) by 161 days.

(21) Appl. No.: 18/638,324

(22) Filed: Apr. 17, 2024

(65) Prior Publication Data

US 2024/0342056 A1 Oct. 17, 2024

Related U.S. Application Data

(60) Provisional application No. 63/496,546, filed on Apr. 17, 2023.

(51) Int. Cl.

| | |
|---|---|
| ***B65D 83/04*** | (2006.01) |
| ***A61J 1/03*** | (2023.01) |
| ***A61J 1/14*** | (2023.01) |
| ***A61J 7/00*** | (2006.01) |

(52) U.S. Cl.

CPC ............... *A61J 1/1418* (2015.05); *A61J 1/03* (2013.01); *A61J 7/0076* (2013.01)

(58) Field of Classification Search

CPC .......... A61J 1/03; A61J 1/1418; A61J 1/1412; A61J 7/0076; B65D 83/0409; B65D 83/06; B65D 83/0495; B65D 83/0481; B65D 47/0814; B65D 47/0847; B65D 47/0866; B65D 47/265; B65D 2583/0495; B65D 2583/0409; B65D 2543/00055

USPC .... 206/538, 540, 535, 3; 222/456, 480, 556, 222/565; 221/265, 288, 4, 277; 220/253

See application file for complete search history.

(56) References Cited

U.S. PATENT DOCUMENTS

| | | | | |
|---|---|---|---|---|
| 7,147,130 | B1 | 12/2006 | Clark et al. | |
| 7,438,204 | B2 * | 10/2008 | Conway ................. | B65D 51/18 220/253 |
| 7,735,684 | B2 | 6/2010 | Coe et al. | |
| 8,066,158 | B2 * | 11/2011 | Vogel ................. | B65D 47/0895 220/837 |
| 8,579,116 | B2 | 11/2013 | Pether et al. | |
| 8,662,331 | B2 | 3/2014 | Miceli et al. | |
| 9,511,924 | B1 * | 12/2016 | Crawford ............... | B65D 51/22 |
| 2005/0061706 | A1 | 3/2005 | Reynolds et al. | |
| 2008/0173666 | A1 | 7/2008 | Coe et al. | |
| 2020/0130900 | A1 | 4/2020 | Herbert et al. | |

OTHER PUBLICATIONS

Beth Han, M.D., Ph.D., M.P.H., et al., Intentional Drug Overdose Deaths in the United States, The American Journal of Psychiatry (https://doi.org/10.1176/appi.ajp.2021.21060604) Feb. 2, 2022.

(Continued)

*Primary Examiner* — King M Chu

(74) *Attorney, Agent, or Firm* — Burr & Forman LLP; Ahmed-Zayn Mohamed

(57) ABSTRACT

Disclosed and described herein are systems and methods for controlling the dispensing of medications in solid units. A system may comprise a lid adapter with a dispenser opening and a bottle cover with at least one selection orifice of corresponding diameter to obstruct bulk passage and permit sequential passage of solid units of at least one medication type. The present invention is particularly beneficial for preventing harm from overdose ingestion, such as suicide attempts and/or accidental consumption by children.

13 Claims, 9 Drawing Sheets

(56) References Cited

OTHER PUBLICATIONS

Sheikh Shoib, et al., Over-the-counter drug use in suicidal/self-harm behavior: Scoping review, Health Science Reports (https://onlinelibrary.wiley.com/doi/full/10.1002/hsr2.662) May 24, 2022.
USF Technology Transfer, Improving Prescription Medication Safety, (https://usf.technologypublisher.com/technology/51011) Apr. 26, 2023.
USF Technology Transfer, Flyer Prep Document, Apr. 26, 2023.
USF Technology Transfer, 23T202_Huynh Prior Art Search, Apr. 21, 2023.

* cited by examiner

MEDICATION DISPENSING CONTROL SYSTEMS

CROSS-REFERENCE TO RELATED APPLICATION

This application claims the benefit of and priority to U.S. Provisional Application Ser. No. 63/496,546, filed on Apr. 17, 2023, which is hereby incorporated by reference in its entirety for all that it contains (including all references therein) for all purposes as if restated and set forth fully herein to the maximum extent allowable by law.

BACKGROUND OF THE INVENTION

The present invention relates to systems for controlling the dispensing of medications in solid units, such as capsules, pills, and tablets. Current medication dispensing practices and the prior art fail to control or limit medication dispensing to sequential, or approximately one-by-one, release of medication units. The current norm entails distributing bottles of a given medication or medications, where it is possible to dispense medication units in bulk, or multiple at once, from a bottle opening.

A current problem facing healthcare is the prevalence of intentional or unintentional harm resulting from simultaneous oral ingestion or other administration of numerous capsules, pills, and/or tablets in excess of a safe dosage. These tragedies may occur across various settings and types of facilities and levels of care, and particularly may occur in outpatient settings. For example, a child or other person of limited capacity or competence might bypass existing child-lock technologies and gain access to an excessive number of medication units. Further, individuals may attempt or commit suicide via ingestion of numerous medication units at once. It is known to persons having ordinary skill in the art that suicide is often an impulsive decision. As such, it is self-evident that safety mechanisms hindering the ability to dispense medications in bulk are important, needed, and useful. The present invention poses additional benefits, such as deterrent effect by adding inconvenience (e.g., decreased rate of dispensing) and even auditory alerts (e.g., rattling sound of medications from increased shaking required for dispensing) to nearby individuals who might be able to provide help in certain situations (such as children having accessed a medication bottle, suicide attempts, etc.). The present invention may be discussed with reference to medications and/or healthcare, but it will be understood that the present invention and its features may apply beyond medications and/or healthcare.

Other features of the present invention will be apparent to persons having ordinary skill in the art in light of this disclosure and description.

BRIEF SUMMARY OF THE INVENTION

It shall be understood the invention described herein comprises systems, which may include apparatuses, assemblies, devices, and/or kits, and may also include methods pertaining to the same.

In certain embodiments of the present invention, a medication dispensing control system may comprise a bottle cover and a lid adapter, the lid adapter comprising a dispenser opening, and the bottle cover comprising at least one selection orifice, each orifice having a corresponding diameter to obstruct bulk passage and permit sequential passage of solid units of at least one medication type.

In certain embodiments, the bottle cover may further comprise a latch adapted to fixate the bottle cover to an opening of a bottle.

In certain embodiments, the bottle may comprise an annular lip, and the latch may comprise a downwardly projecting annular latch along a latch diameter disposed external to the one or more selection orifices.

In certain embodiments, the annular latch may comprise an inwardly upwardly tapered edge leading to a circumferential recess along the latch diameter above the tapered edge such that the recess aligns with the lip in fixation.

In certain embodiments, the bottle cover may further comprise a ledge adapted to fixate the bottle cover to the lid adapter.

In certain embodiments, the ledge may comprise an outwardly projecting annular ledge extending to a ledge diameter greater than and disposed external to the latch diameter.

In certain embodiments, the lid adapter may comprise two or more downwardly projecting tabs adapted to fixate the lid adapter to the annular ledge.

In certain embodiments, each tab may comprise an inwardly upwardly tapered wedge leading to a notch above the wedge, the tabs disposed along the lid adapter such that the notches align with two or more points on the annular ledge along the ledge diameter in fixation.

In certain embodiments, the annular ledge may further comprise two or more rods adapted to obstruct at least one tab from rotating along the ledge diameter.

In certain embodiments, the annular ledge may comprise two rods for each tab, the rods disposed along the annular ledge to align on opposite sides of each tab when the annular ledge is within the notches.

In certain embodiments, the lid adapter may comprise a rounded base of a base diameter and an upwardly extending annular column of a column diameter, the column diameter being smaller than and disposed internal to the base diameter.

In certain embodiments, the column may comprise a vertical outer surface adapted to engage a lid, and the base may comprise a horizontal top surface.

In certain embodiments, the vertical outer surface may comprise clockwise spiral downward screw threads.

In certain embodiments, the lid may comprise at least one block projecting inwardly, and the horizontal top surface may comprise at least one depressible portion with an upwardly projecting incline in the clockwise direction along the column diameter leading to a border aligned to engage one such block. In certain embodiments, clockwise rotation of the lid along the column seats one such block clockwise to at least one upwardly projecting incline and the corresponding border obstructs the block from counterclockwise rotation in a first configuration, and depressing the corresponding depressible portion until the border is below the block disengages said block in a second configuration.

In certain embodiments, the lid may comprise at least one strut projecting inwardly, and the vertical outer surface may comprise at least one outwardly projecting receiver aligned to engage one such strut. In certain embodiments, each receiver may comprise a downwardly projecting decline in the clockwise direction along the column diameter leading to a border, a slot disposed further clockwise, and a post disposed further clockwise. In certain embodiments, clockwise rotation of the lid along the column seats one such strut in the slot between the post and the border in a first configuration, and pushing the strut down below the border disengages said strut in a second configuration.

In certain embodiments of the present invention, a medication dispensing control method may comprise deploying a bottle cover over an opening of a bottle and deploying a lid adapter over the bottle cover. In certain embodiments, the bottle cover may comprise at least one selection orifice, each of a corresponding diameter to obstruct bulk passage and permit sequential passage of solid units of at least one medication type per selection orifice. In certain embodiments, the lid adapter may comprise a dispenser opening and may be aligned to one such selection orifice.

In certain embodiments of the present invention, a medication dispensing control system may comprise a lid, a bottle with an opening, a bottle cover, and a lid adapter. The bottle cover may comprise at least one selection orifice, each of corresponding diameter to obstruct bulk passage and permit sequential passage of solid units of at least one medication type per selection orifice. The bottle cover may be adapted to engage the bottle at its opening. The lid adapter may be adapted to engage the lid and the bottle cover, and may comprise a dispenser opening, which may align to one such selection orifice.

BRIEF DESCRIPTION OF THE DRAWINGS

For purpose of explanation, aspects of several embodiments are represented in the following illustrative figures, wherein.

DETAILED DESCRIPTION OF THE INVENTION

In the disclosure herein, details are set forth for purpose of description. However, a person having ordinary skill in the art will realize the invention may be practiced without all the specifics herein. The embodiments and explanations are intended, therefore, to be illustrative only, and not limiting. Similarly, where examples are used, they are not intended to be limiting unless the context clearly indicates otherwise. Accordingly, "for example" or "e.g." should be read as "for example, and without limitation," unless the context clearly indicates limitation is intended.

Certain directional terms are used herein, such as above, below, down, downward, external, in, inside, internal, inward, out, outside, outward, up, upward, etc. As used herein, these directional terms are meant to be understood in reference to a cylindrical medication bottle meant to exist or 'stand' upright while its component medication(s) are in storage, with the bottle having an opening and lid oriented and disposed at the top of the bottle. Variations within the scope of the present invention will be apparent to persons having ordinary skill in the art.

Herein, the meaning of "adapted" includes: adapted, adjusted, arranged, automated, automatized, calibrated, changed, computerized, configured, connected, constructed, coordinated, designed, directed, disposed, established, fashioned, formatted, formed, instructed, modified, mechanized, modulated, operable, operated, organized, positioned, programmed, regulated, set up, shaped, sized, structured, and tailored, as appropriate to render an item suitable for use with another item, step, or apparatus. Herein, the terms "adapted," "adapter," "adaption," "communicable," "communicably," "connected," "connection," "disposed," "operable," "operably," and "operate" are intended as indications of structure, and not function. Herein, deployment may include via fixation and/or adaptation.

The meaning of other terms may be defined herein explicitly or otherwise and/or will be apparent to persons having ordinary skill in the art.

Figure 1:
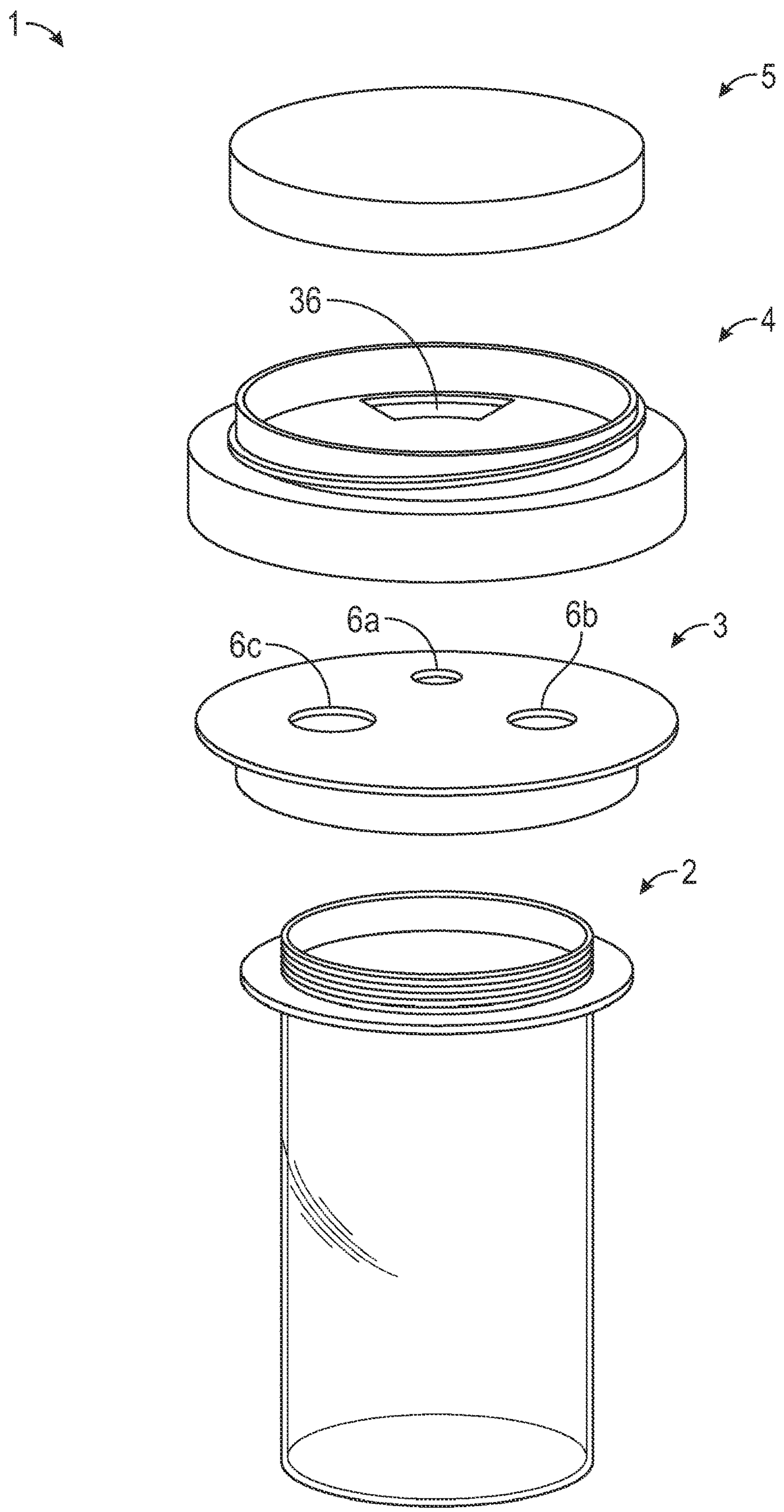
FIG. 1 depicts a medication dispensing control system according to the present invention.

FIG. 1 depicts a medication dispensing control system 1 comprising a bottle cover 3 and lid adapter 4. Bottle cover 3 comprises at least one selection orifice 6, each of a corresponding diameter that roughly obstructs bulk passage of, yet permits roughly sequential passage of, at least one medication type in a solid unit, such as a pill, tablet, or capsule. Lid adapter 4 comprises a dispenser opening 36. In certain embodiments, bottle cover 3 and lid adapter 4 are adapted to be affixable together (including permanently), bottle cover 3 is adapted to be affixable to a bottle 2 (including permanently), and lid adapter 4 is adapted to temporarily selectively engage a lid 5. Bottle 2, and generally the bottles discussed herein, may be of many different sizes, shapes, dimensions, and configurations, and may direct various different sizes, shapes, dimensions, and/or configurations for pertinent corresponding features of the present invention, which will be readily apparent to persons having ordinary skill in the art, and may include standard versions of such bottle or other sizes, shapes, and/or configurations known in the industry.

Figure 2:
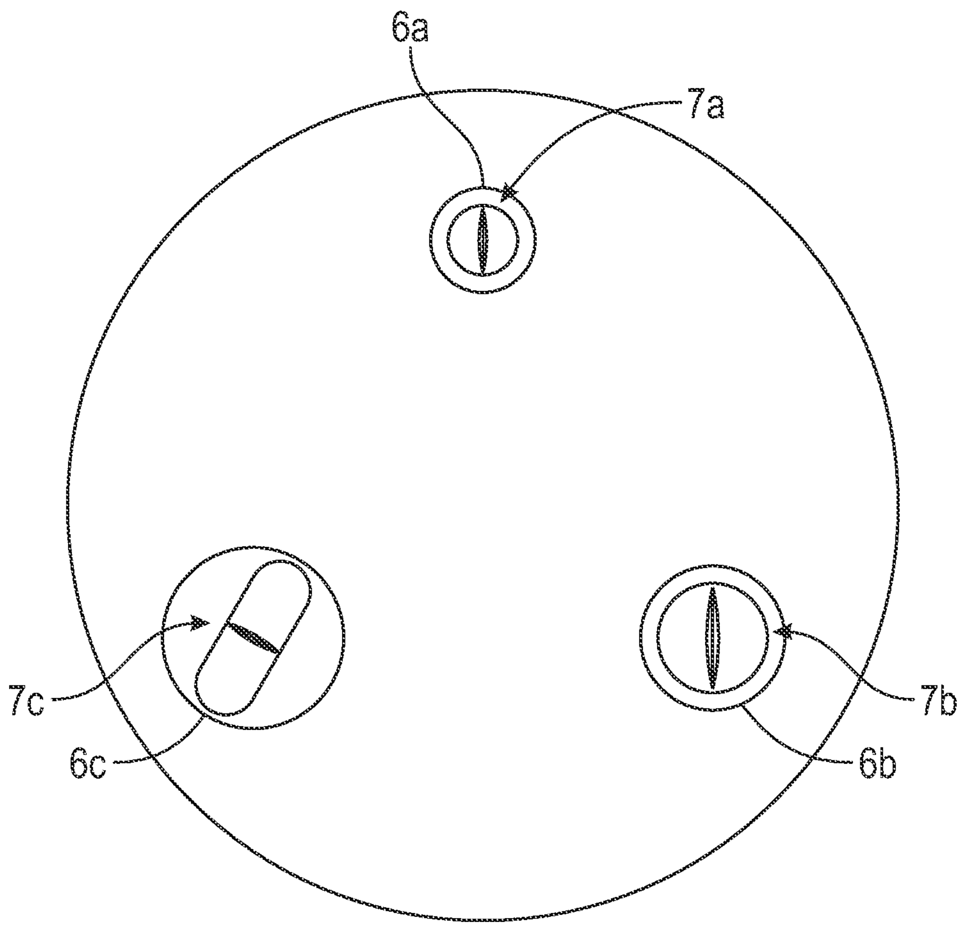
FIG. 2 depicts medications and a bottle cover according to the present invention.

FIG. 2 depicts a top view of bottle cover 3. Bottle cover 3 comprises differently sized selection orifices 6*a*, 6*b*, 6*c* illustrated with corresponding medications 7*a*, 7*b*, 7*c*, being generally representative of roughly small, medium, and large sizes, respectively, across a wide range of common tablets, pills, and capsules. In exemplary embodiments, medication 7*a* comprises a 4 mg ondansetron hydrochloride (e.g., Zofran®) orally disintegrating tablet or orally dissolving tablet (ODT), measuring about 1.1×5.6 mm. In exemplary embodiments, the diameter of orifice 6*a* may be greater than 1.1 mm (i.e., larger than the smallest dimension of the corresponding medication of interest) and less than 11.2 mm (i.e., less than double the largest dimension of the corresponding medication of interest). In certain embodiments, the diameter of orifice 6*a* is between approximately 6 mm and 10 mm.

In exemplary embodiments, medication 7*b* comprises a 220 mg naproxen sodium (e.g., Aleve®) oval capsule shaped tablet, measuring about 12 mm. In certain embodiments, the diameter of orifice 6*b* is between approximately 13 mm and 18 mm. In exemplary embodiments, medication 7*c* comprises a 500 mg acetaminophen (e.g., Tylenol®) oblong capsule, measuring about 19 mm. In certain embodiments, the diameter of orifice 6*c* is between approximately 20 mm and 26 mm.

In certain embodiments, any of orifices 6*a*, 6*b*, 6*c* may be sized for sequential passage of any standard sized capsule, such as sizes 000, 00, 0, 1, 2, 3, 4, and 5, including capsules of hydroxypropyl methylcellulose or hypromellose (HPMC), gelatin, and/or pullulan. In certain embodiments, any of orifices 6*a*, 6*b*, 6*c* may be sized for sequential passage of any standard sized tablet, including tablets ranging from 1 mm to 22 mm.

Figure 3:
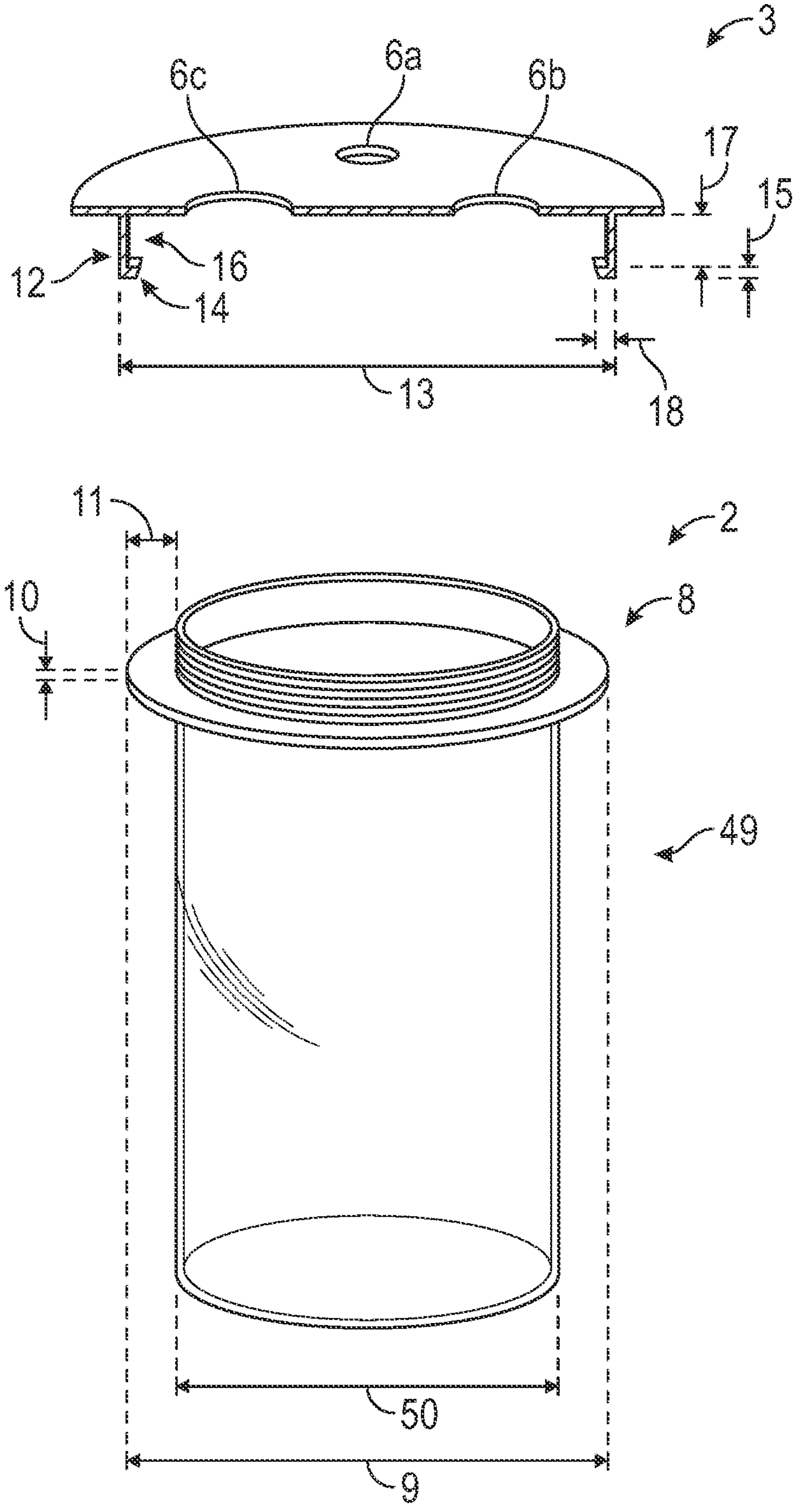
FIG. 3 depicts a bottle and bottle cover according to the present invention.

FIG. 3 illustrates interaction between bottle cover 3 and bottle 2. In certain embodiments of system 1, bottle cover 3 comprises a latch 12 adapted to fixate bottle cover 3 over an opening of bottle 2. In many bottles used for medications, such as in FIG. 3, bottle 2 comprises a circumferential lip such as lip 8. Bottle lips may vary in configuration, and the scope of the present invention also includes systems where a bottle cover's latch may affix to even those bottles that do not have a fully circumferential lip. For example, persons having ordinary skill in the art will readily see that the embodiments of latches disclosed herein may fixate a bottle cover by engaging, in similar manner to a lip, what are essentially the equivalents of receivers discussed herein (e.g. with bottles that may have comprised such receiver equivalents for direct interaction with a lid).

In FIG. 3, bottle 2 comprises bottle body 49 with body diameter 50. Bottle 2's lip 8 comprises a lip height 10 and radially protrudes out from bottle body 49 by a lip radial depth 11, extending to a lip diameter 9. Lip diameter 9 is greater than, and disposed external to, body diameter 50, which is disposed external to and beyond the peripheries of bottle cover 3's orifices 6*a*, 6*b*, 6*c*. Bottle cover 3 comprises a downwardly projecting annular latch 12, which comprises an inwardly and upwardly tapered edge 14 of edge height 15, leading to a recess 16 (located above edge 14) of recess height 17. The radial depth of recess 16 is also the radial depth of edge 14 at its point of maximal internal projection (i.e., the top aspect of edge 14), together labeled latch radial depth 18. In exemplary embodiments, the segment of latch 12 extending along recess height 17 (i.e., connecting edge 14 to the remainder of bottle cover 3) comprises a malleable material. In certain embodiments, pushing bottle cover 3 downward onto bottle 2 results in edge 14 engaging lip 8, wherein the tapering of edge 14 allows one-way downward advancement of latch 12 further over lip 8 until lip 8 reaches (and, e.g., 'snaps' into) recess 16 to rest in a locked state. Latch 12 is sized for lip 8 to align to recess 16 in fixation; e.g., lip diameter 9 may match (e.g., approximately) latch diameter 13, and recess height 17 may match (e.g., approximately) or exceed lip height 10. In some embodiments, recess height 17 may match (e.g., approximately) the sum of lip height 10 and what vertical distance there may be between lip 8 and the opening of bottle 2.

Latches need not necessarily be annular or fully circumferential. In certain embodiments, a medication dispensing control system comprises a bottle cover with a plurality of latches, each extending for a partial arc around a bottle's lip(s). Further, latches need not necessarily comprise a tapered edge, and/or the edge need not necessarily be inwardly upwardly tapered. Persons having ordinary skill in the art will readily appreciate other latch mechanisms and/or configurations for affixing a bottle cover to a bottle within the scope of the present invention.

Figure 4:
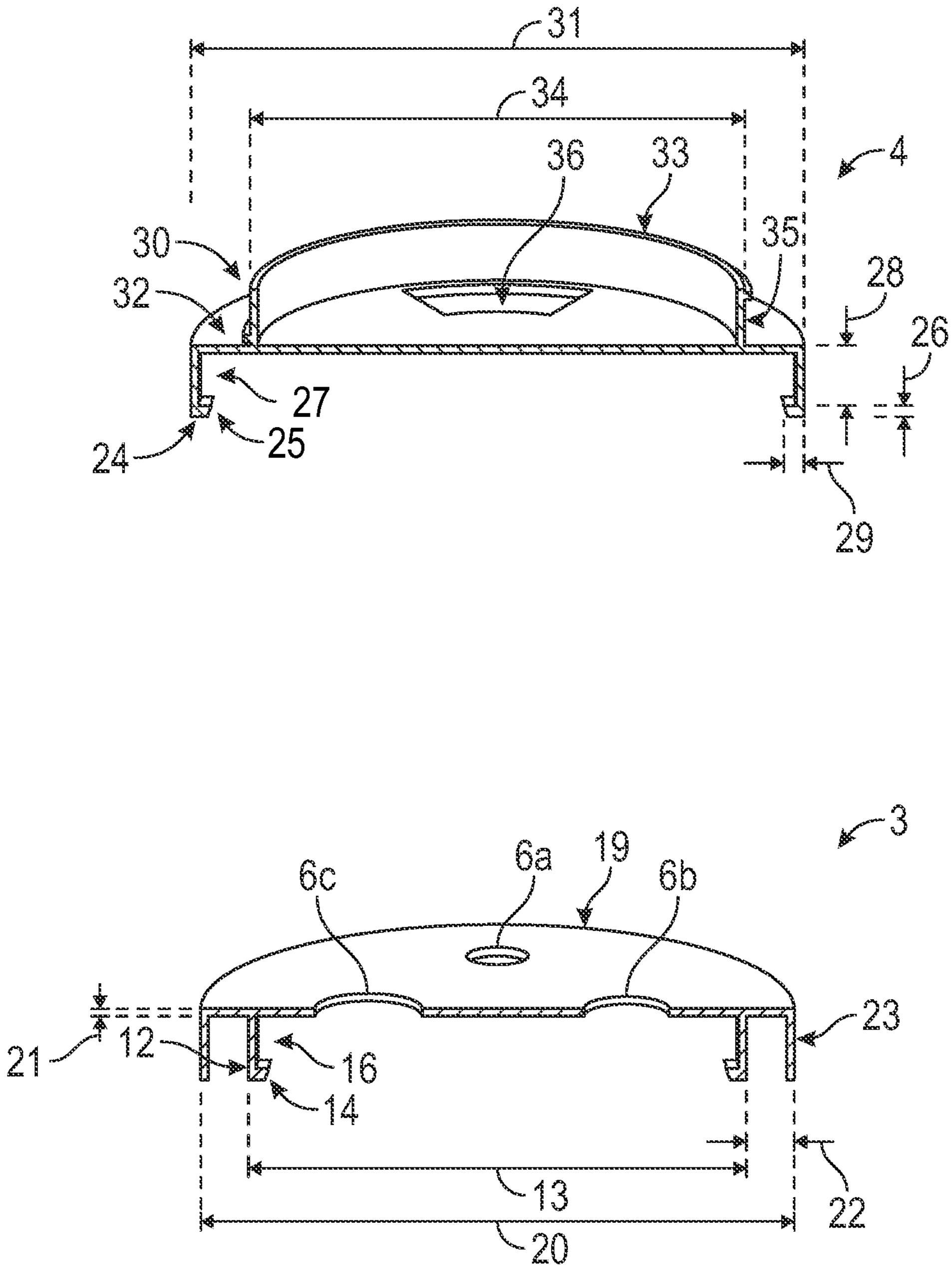
FIG. 4 depicts a bottle cover and lid adapter according to the present invention.

Turning now to FIG. 4, shown is an illustration of interaction between bottle cover 3 and lid adapter 4. In certain embodiments, lid adapter 4 can be affixed to bottle cover 3. In exemplary embodiments, lid adapter 4 and bottle cover 3 are affixed in a selected alignment such that dispenser opening 36 overlies, and is in fluid communication with, one of orifices 6*a*, 6*b*, or 6*c*. This can be done based on the size, shape, and/or other characteristic of a desired corresponding medication to be controlled in how it is dispensed (such as, e.g., one of medications 7*a*, 7*b*, or 7*c*). Persons having ordinary skill in the art will readily see different variations of bottle cover 3 and lid adapter 4, as well as different combinations of said bottle cover 3 and/or lid adapter 4 options, resulting in permutations that may be desirable in different settings depending on the underlying medication as well as the shape, size, and/or other characteristics of an underlying bottle, such as bottle 2.

In FIG. 4, bottle cover 3 comprises an annular ledge 19, of ledge height 21, disposed above latch 12 and radially protruding out beyond latch 12 by a ledge radial depth 22, extending to a ledge diameter 20. Ledge diameter 20 is greater than and disposed external to latch diameter 13.

Lid adapter 4 comprises dispenser opening 36, rounded base 30 of base diameter 31 with a horizontal top surface 32, and an upwardly projecting annular column 33 of column diameter 34 with a vertical outer surface 35 adapted to engage a lid. Column diameter 34 is smaller than and disposed internal to base diameter 31. In certain embodiments, like FIG. 4, dispenser opening 36 is essentially two-dimensional and disposed at the level of base 30. However, in other embodiments, a lid adapter may comprise a dispenser opening that is essentially a tunnel or channel (not drawn), with upwardly projecting walls extending from a base (e.g., one similar to base 30) along the height of a column (e.g., one similar to column 33).

Lid adapter 4 further comprises two or more downwardly projecting tabs 24 adapted to fixate lid adapter 4 to ledge 19. Each tab 24 comprises an inwardly upwardly tapered wedge 25 of wedge height 26, leading to a notch 27 (located above wedge 25) of notch height 28. The radial depth of notch 27 is also the radial depth of wedge 25 at its point of maximal internal projection (i.e., the top aspect of wedge 25), together labeled tab radial depth 29. Tabs 24 are disposed along lid adapter 4 such that notches 27 align in fixation with two or more points on ledge 19 peripherally along ledge diameter 20.

In exemplary embodiments, the segment of tab 24 extending along notch height 28 (i.e., connecting wedge 25 to the remainder of lid adapter 4) comprises a malleable material. In certain embodiments, pushing lid adapter 4 downward onto bottle cover 3 results in wedges 25 engaging ledge 19, wherein the tapering of wedges 25 allows one-way downward advancement of tabs 24 further over ledge 19 until ledge 19 reaches (and, e.g., 'snaps' into) notches 27 (e.g., to rest in a locked state). Tabs 24 are sized and positioned for ledge 19 to align to notches 27 in fixation. For example, ledge height 21 may match (e.g., approximately) notch height 28.

Ledges, columns, and bases need not necessarily be rounded, annular, or fully circumferential. In certain embodiments, a medication dispensing control system comprises a bottle cover with a plurality of ledges, each extending for a partial arc around a ledge diameter. Further, tabs need not necessarily comprise a tapered wedge, and/or the wedge need not necessarily be inwardly upwardly tapered. Persons having ordinary skill in the art will readily appreciate other ledge and tab variations, and/or mechanisms and/or configurations for affixing a bottle cover to a lid adapter, within the scope of the present invention.

In certain embodiments, bottle cover 3 further comprises two or more rods 23 adapted to obstruct at least one tab 24 from rotation along ledge 19. When bottle cover 3 and lid adapter 4 are affixed with ledge 19 within notches 27, rotating motion is blocked because a tab 24 cannot translate past a rod 23. In exemplary embodiments, a bottle cover 3 would comprise two rods 23 per tab 24, straddling each tab 24 when bottle cover 3 and lid adapter 4 are in fixated alignment, to prevent both clockwise and counterclockwise drift. However, the ratio could be reversed or inverted. In other embodiments (not illustrated), a system according to the present invention could comprise two tabs per rod, with the tabs straddling either side of each rod. Other ratios, arrangements, and/or configurations will be readily apparent to those of ordinary skill in the art. Desired deployments of tab(s) 24 and rod(s) 23 could be used to guide when, where, and/or how to fixate and/or lock a lid adapter 4 in position relative to bottle holder 3 so dispenser opening 36 selectively overlies one selection orifice, such as 6*a*, 6*b*, or 6*c*.

The features of the present invention maintain compatibility with child-lock mechanisms known in the art. For example, in a system where a bottle and a lid may independently directly engage and interlock, lid adapters discussed herein preserve surface features to engage and interlock the lid in the same manner. Persons having ordinary skill in the art will readily see different variations and combinations of lid adapters according to the present invention for use in connection with various bottle and lid types and configurations.

FIGS. 5-7B depict certain embodiments of lid adapters 4, 4*a*, and 4*b* with corresponding lids 5, 5*a*, and 5*b*.

Figure 5:
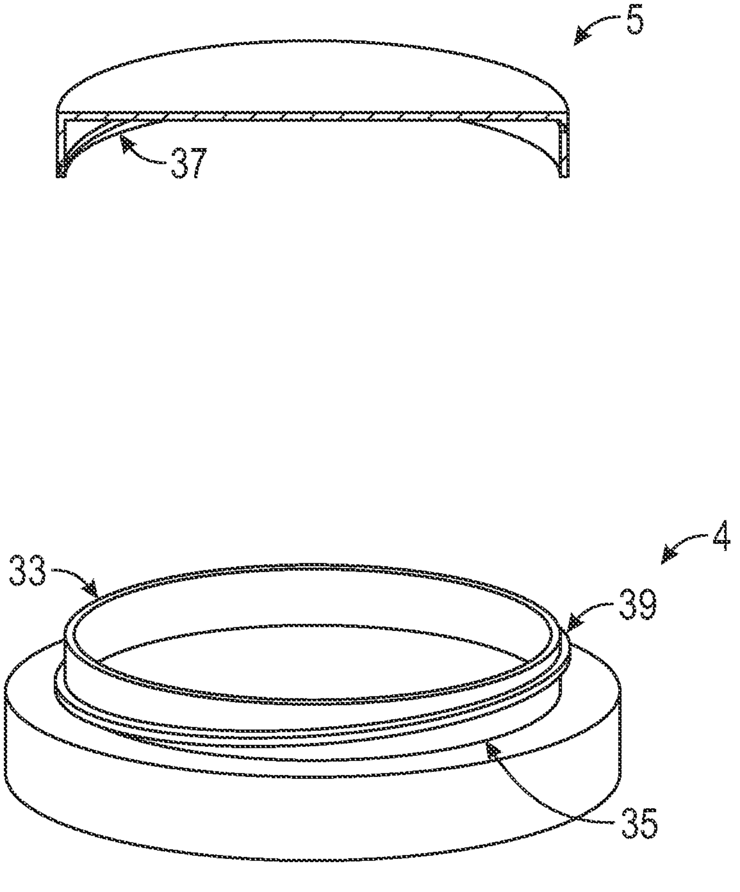
FIGS. 5-7B depict lid adapters and lids according to the present invention.

In FIG. 5, lid 5 comprises internal screw threads 37. The vertical outer surface 35 of column 33 of lid adapter 4 comprises external screw threads 39. Screw threads 37, 39 spiral downwards in a clockwise fashion and are operable to temporarily selectively engage one another. In certain embodiments, a child-lock mechanism may comprise a lid with internal screw threads having a limited degree of free vertical translation within the lid, wherein the lid spins freely independent of the internal screw threads in a first configuration and requires downward pressure on the lid to achieve a second configuration where spinning the lid also rotates (e.g., to unscrew) the internal screw threads thus allowing disengagement (e.g., from the external screw threads of a lid adapter).

Figure 6A:
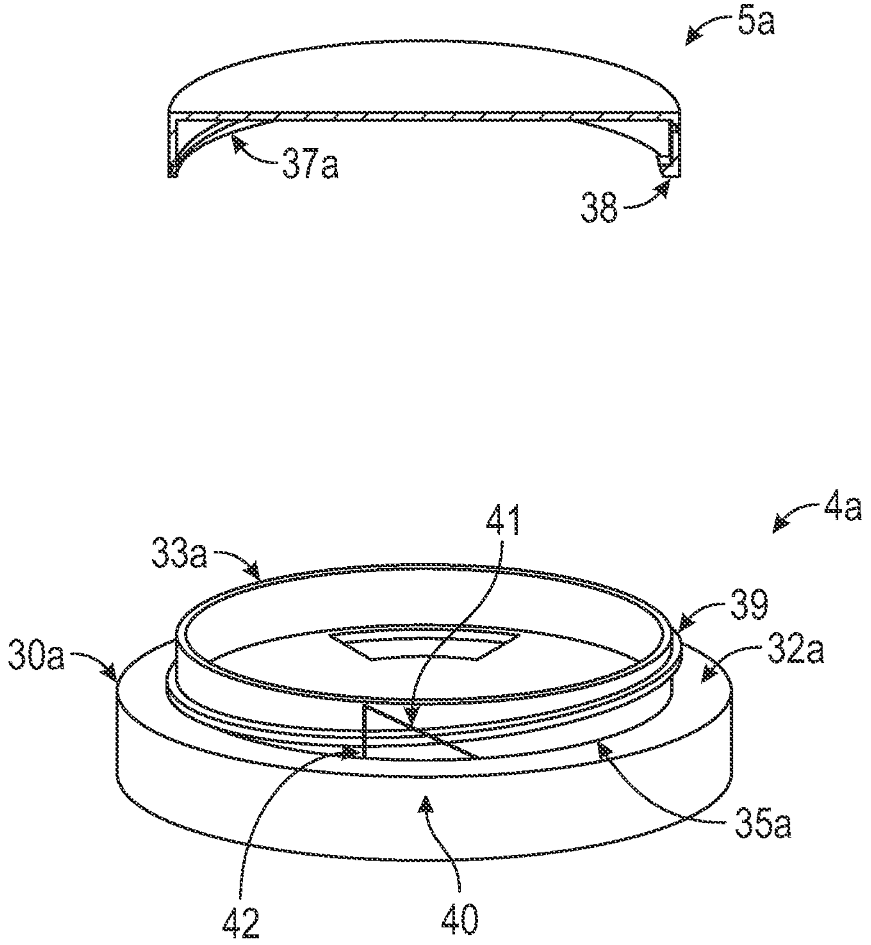

FIG. 6A illustrates lid 5*a*, comprising internal screw threads 37*a* and further comprising at least one block 38 projecting inwardly, and lid adapter 4*a*, comprising a column 33*a* with a vertical outer surface 35*a* with external screw threads 39*a*. Lid adapter 4*a* also comprises base 30*a* with top surface 32*a*, which is at least partially depressible, such as at depressible portion(s) 40. At depressible portion(s) 40, top surface 32*a* comprises an upwardly projecting incline 41 leading to an incline border 42. In certain embodiments, screw threads 37*a*, 39*a* spiral downwards in a clockwise direction and incline 41 projects upward in the clockwise direction as well. In exemplary embodiments, incline 41 and incline border 42 are aligned to engage one such block 38 (e.g., when lid 5*a* is being screwed onto lid adapter 4*a*, at the point nearing or upon completion of the ability for screw threads 37*a* and 39*a* to interlock).

Figure 6B:
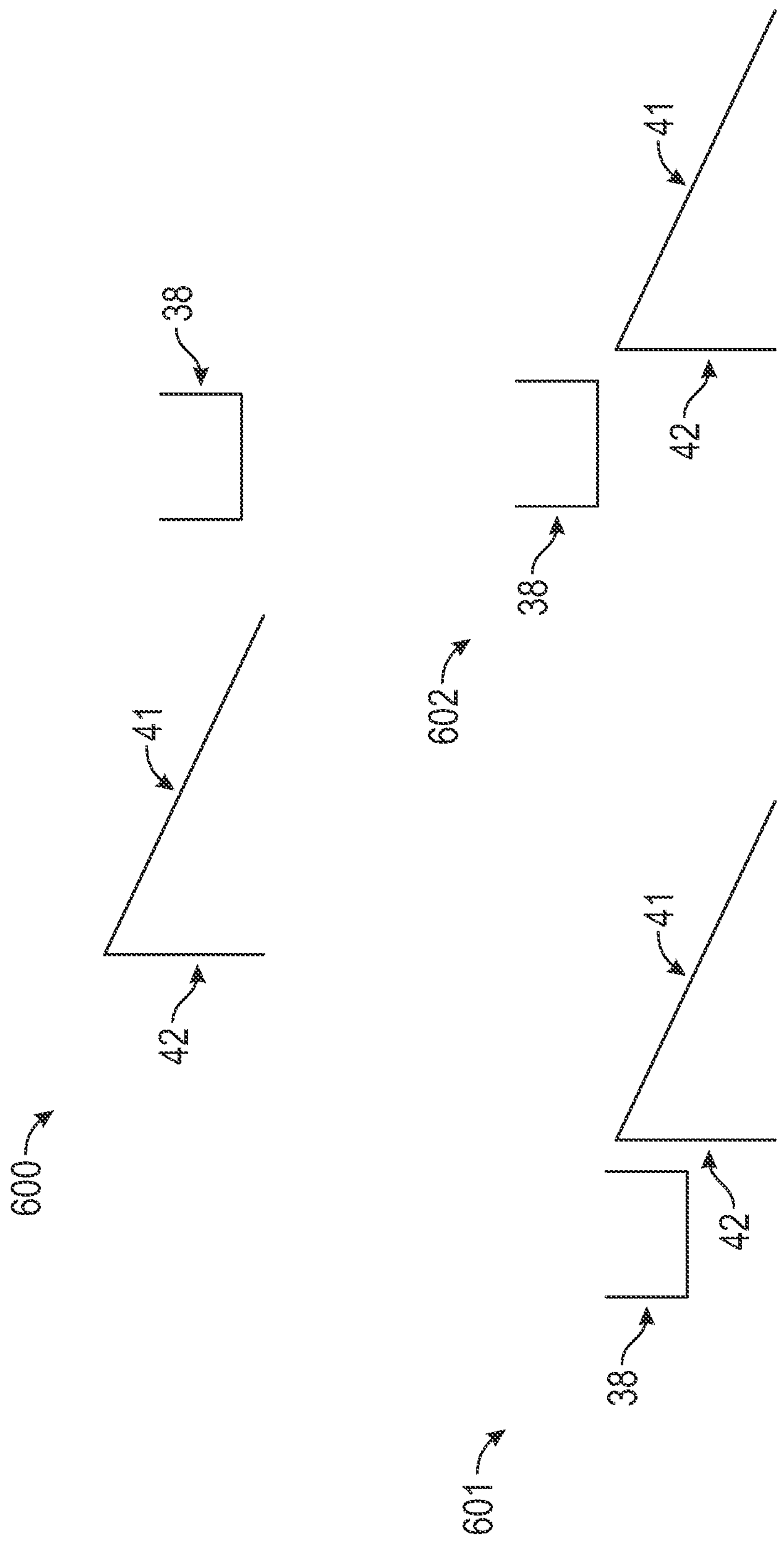

As seen in FIG. 6B, block 38 may translate from a pre-engagement configuration 600 over and past incline 41 in the clockwise direction (e.g., due to the gradual upward slope of incline 41). However, upon making it over and past incline border 42, block 38 falls (and/or 'clicks') into a position where it cannot translate back in a counterclockwise direction now with incline border 42 blocking the way. As such, in a first configuration 601, lid 5*a* is locked onto lid adapter 4*a*. In a second configuration 602, depressing depressible portion 40 (e.g., manually by a user of sufficiently sophisticated capacity and competence, such as a human adult) downwardly translates incline border 42 (and incline 41) until it no longer obstructs the rotational path of block 38, thus disengaging block 38 and allowing lid 5*a* to be unscrewed from lid adapter 4*a* (e.g., via counterclockwise rotation). In some embodiments, the entirety of top surface 32*a*, and/or base 30*a*, may be depressible.

Figure 7A:
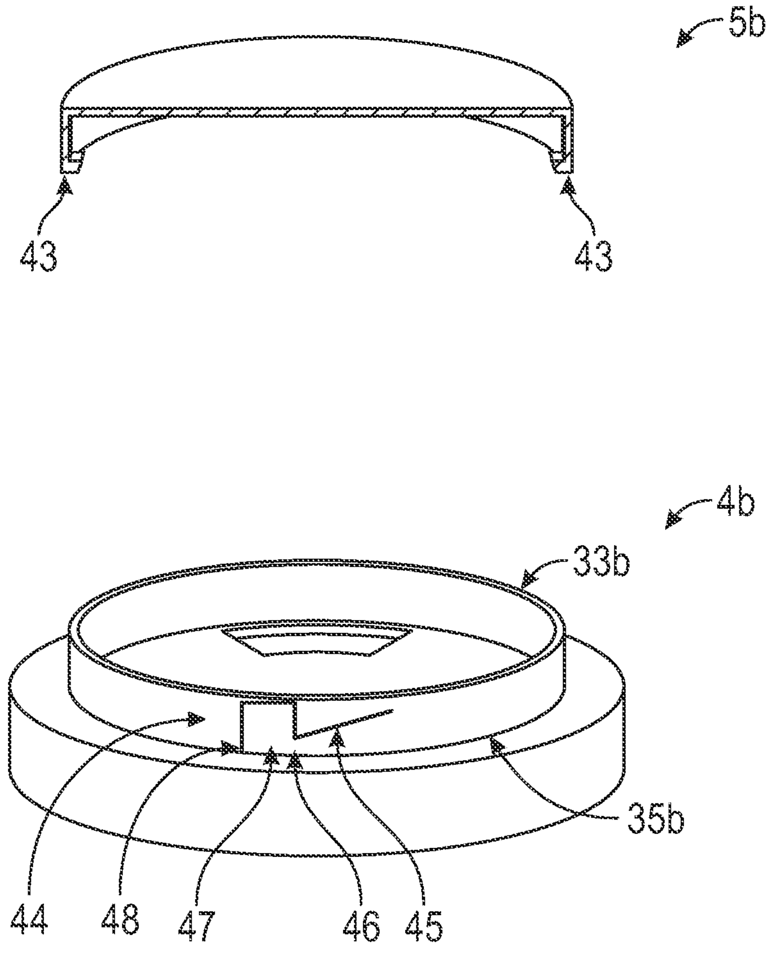

Finally, FIG. 7A illustrates lid 5*b*, comprising one or more struts 43 projecting inwardly, and lid adapter 4*b*, comprising a column 33*b* with a vertical outer surface 35*b* with one or more receivers 44. Each receiver 44 is aligned to engage one such strut 43. Each receiver 44 comprises a downwardly projecting decline 45 leading to a decline border 46, a slot 47, and a post 48. In exemplary embodiments, decline 45 projects downward in the clockwise direction, with slot 47 disposed further clockwise than decline border 46, and post 48 disposed further clockwise than slot 47. In certain embodiments, strut(s) 43 match the size of slot(s) 47.

Figure 7B:
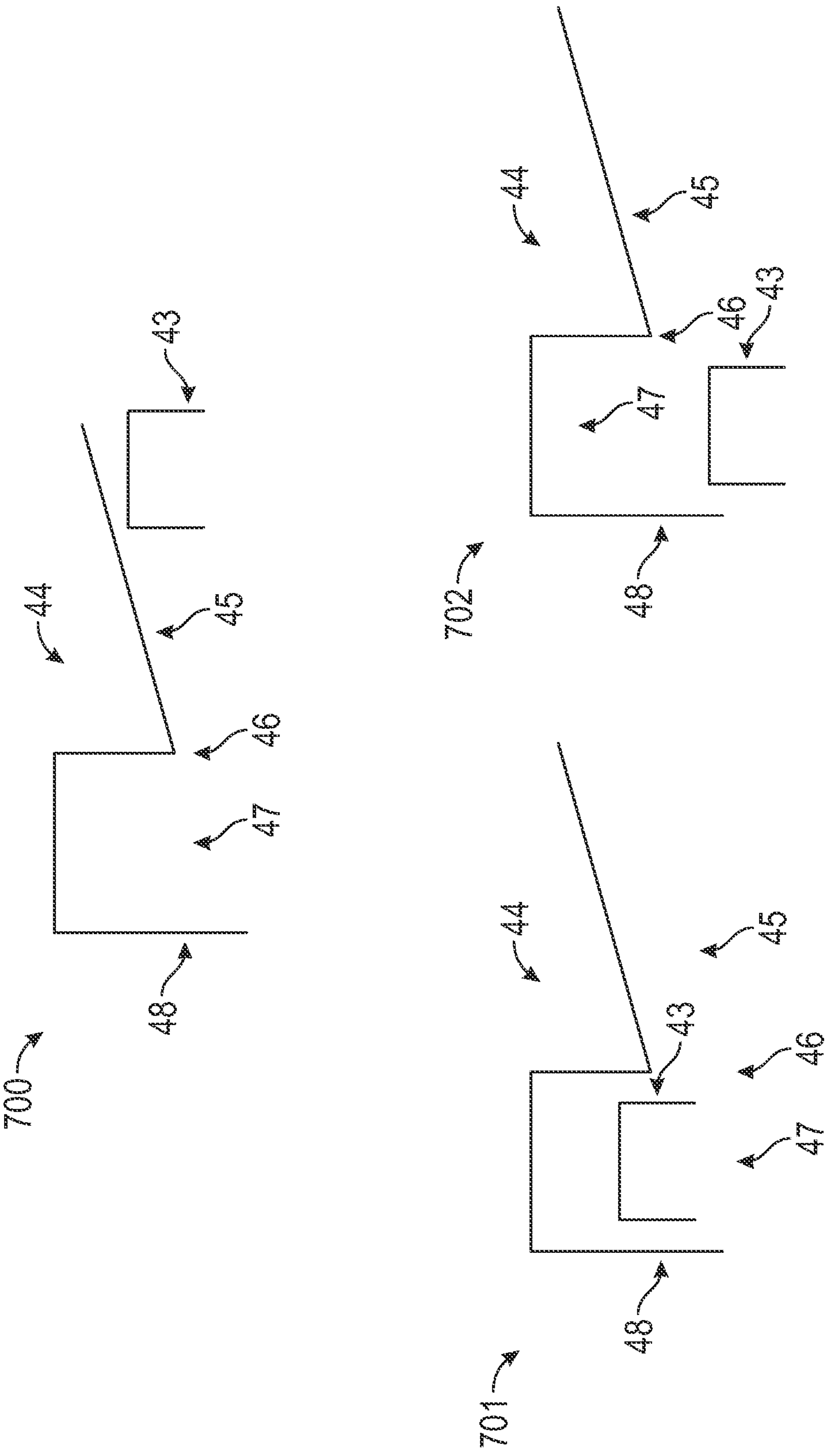

As seen in FIG. 7B, a strut 43 may translate from a pre-engagement configuration 700 under and past decline 45 in the clockwise direction (e.g., due to the gradual downward slope of decline 45). However, upon making it under and past decline border 46, strut 43 slips (and/or 'clicks') into a position where it cannot translate back in a counterclockwise direction now with decline border 46 blocking the way. Furthermore, strut 43 also cannot translate further in the clockwise direction given the obstructing presence of post 48. As such, in first configuration 701, lid 5*b* is locked onto lid adapter 4*b*. In second configuration 702, depressing a strut 43 (e.g., manually by a user of sufficiently sophisticated capacity and competence, like a human adult), such as by pushing lid 5*b* downward, translates strut 43 downward until its rotatory path is no longer obstructed by decline border 46 or post 48, thus disengaging lid 5*b* and allowing free rotation of lid 5*b* with respect to lid adapter 4*b*, such as for twisting and removal of lid 5*b*.

As discussed herein, certain bottles may comprise surface features similar to those of receivers 44 (e.g., a downwardly projecting decline to a decline border, slot, and post). Such receiver equivalents may project radially outward from the bottle's body. In such cases, the receiver equivalents may essentially comprise a bottle's lip(s) as discussed herein, with lip height being the height of the receiver equivalent component of greatest height (e.g., its post). Latches disclosed herein may fixate a bottle cover to a bottle with receiver equivalents wherein the latch (e.g., its tapered edge) advances past the receiver equivalent's post, with the post fitting into the latch's recess.

Components of the present invention can comprise commonly used materials in the art, such as plastic, rubber, glass, polymeric materials, metals, and/or alloys. In some embodiments, a bottle, lid, bottle cover, lid adapter, and/or any component thereof, may comprise one or more items selected from the group consisting of: medical grade plastic, glass, stainless steel, aluminum, polytetrafluoroethylene, polyethylene, polypropylene, and polyisoprene.

The present invention also includes methods of controlling medication dispensing pertaining to the systems, apparatuses, assemblies, devices, and/or kits according to the present disclosure. In certain embodiments, a method may comprise deploying a bottle cover over an opening of a bottle and deploying a lid adapter over the bottle cover. In certain embodiments, the bottle cover comprises at least one selection orifice, each of corresponding diameter to obstruct bulk passage and permit sequential passage of solid units of at least one medication type per selection orifice. In certain embodiments, the lid adapter comprises a dispenser opening and is aligned to one such selection orifice. Persons having ordinary skill in the art will readily see the method embodiments of the present invention include all the same and corresponding variations and features described in greater detail regarding earlier system embodiments discussed regarding the present invention.

The foregoing pertains to certain embodiments only. Persons having ordinary skill in the art will readily detect improvements or variations that may apply to other embodiments within the scope of this invention in light of this disclosure. The disclosure herein provides description of the present invention and elements thereof. It will be understood that such specifics are for illustrative and exemplary purposes only and are not intended to be limiting. The invention described herein is not intended to be limited to the embodiments discussed in the detailed description or shown in the figures. The figures are only meant to be generally representative and are not necessarily drawn to scale. The figures are not meant to be inherently limiting as to relative proportions.

What is claimed is:

1. A medication dispensing control system, comprising a bottle;

a bottle cover, comprising at least one selection orifice, each of corresponding diameter to obstruct bulk passage and permit sequential passage of solid units of at least one medication type per orifice; and a lid adapter, comprising a dispenser opening, wherein:

the bottle comprises an opening and an annular lip;

the bottle cover comprises a latch adapted to fixate the bottle cover to the opening of the bottle, further wherein the latch comprises a downwardly projecting annular latch along a latch diameter disposed external to the one or more selection orifices; and the annular latch comprises an inwardly upwardly tapered edge leading to a circumferential recess along the latch diameter above the tapered edge such that the recess aligns with the lip in fixation.

2. A medication dispensing control system, comprising a bottle cover, comprising at least one selection orifice, each of corresponding diameter to obstruct bulk passage and permit sequential passage of solid units of at least one medication type per orifice; and a lid adapter, comprising a dispenser opening, wherein:

the bottle cover further comprises a ledge adapted to fixate the bottle cover to the lid adapter; and the ledge comprises an outwardly projecting annular ledge extending to a ledge diameter.

3. The system of claim 2, the lid adapter comprising two or more downwardly projecting tabs adapted to fixate the lid adapter to the annular ledge.

4. The system of claim 3, each tab comprising an inwardly upwardly tapered wedge leading to a notch above the wedge, the tabs disposed along the lid adapter such that the notches align with two or more points on the annular ledge along the ledge diameter in fixation.

5. The system of claim 4, the annular ledge further comprising two or more rods adapted to obstruct at least one tab from rotating along the ledge diameter.

6. The system of claim 5, the annular ledge comprising two rods for each tab, the rods disposed along the annular ledge to align to opposite sides of each tab when the annular ledge is within the notches.

7. A medication dispensing control system, comprising a bottle cover, comprising at least one selection orifice, each of corresponding diameter to obstruct bulk passage and permit sequential passage of solid units of at least one medication type per orifice; and a lid adapter, comprising a dispenser opening, wherein:

the lid adapter comprises a rounded base of a base diameter and an upwardly extending annular column of a column diameter smaller than and disposed internal to the base diameter; and the base comprises a horizontal top surface and the column comprises a vertical outer surface adapted to engage a lid.

8. The system of claim 7, the vertical outer surface comprising clockwise downward spiral screw threads.

9. The system of claim 8, the lid comprising at least one block projecting inwardly, and the horizontal top surface comprising at least one depressible portion with an upwardly projecting incline in the clockwise direction along the column diameter leading to a border aligned to engage one such block.

10. The system of claim 9, wherein clockwise rotation of the lid along the column seats one such block clockwise to at least one upwardly projecting incline and the corresponding border obstructs the block from counterclockwise rotation in a first configuration, and depressing the corresponding depressible portion until the border is below the level of the block disengages said block in a second configuration.

11. The system of claim 7, the lid comprising at least one strut projecting inwardly, and the vertical outer surface comprising at least one outwardly projecting receiver aligned to engage one such strut.

12. The system of claim 11, each receiver comprising a downwardly projecting decline in the clockwise direction along the column diameter leading to a border, a slot disposed further clockwise, and a post disposed further clockwise.

13. The system of claim 12, wherein clockwise rotation of the lid along the column seats one such strut in the slot between the post and the border in a first configuration, and pushing the strut down below the level of the border disengages said strut in a second configuration.

* * * * *